United States Patent [19]
Valentine et al.

[11] Patent Number: 5,244,165
[45] Date of Patent: Sep. 14, 1993

[54] DRAG MECHANISM FOR SPIN CAST REELS

[75] Inventors: David E. Valentine; David C. Wuellner, both of Tulsa, Okla.

[73] Assignee: Zebco Corporation, Tulsa, Okla.

[21] Appl. No.: 740,971

[22] Filed: Aug. 6, 1991

[51] Int. Cl.$^5$ ............................................. A01K 89/033
[52] U.S. Cl. .................................... 242/244; 242/311
[58] Field of Search ................. 242/244, 311, 234–240

[56] References Cited

U.S. PATENT DOCUMENTS

| | | | |
|---|---|---|---|
| 2,903,202 | 9/1959 | Sarah | 242/244 X |
| 3,120,357 | 2/1964 | Wood | 242/244 |
| 4,343,442 | 8/1982 | Andersson | 242/244 |
| 4,416,427 | 11/1983 | Kawai | 242/244 |
| 4,778,120 | 10/1988 | Finney et al. | 242/244 |
| 4,696,4378 | 9/1987 | Yoshikawa | 242/244 |

*Primary Examiner*—Joseph J. Hail, III
*Attorney, Agent, or Firm*—Wood, Phillips, VanSanten, Hoffman & Ertel

[57] ABSTRACT

A drag adjustment mechanism in a fishing reel having a housing, a deck plate and a line-carrying spool at least partially within the housing. The drag adjustment mechanism includes a structure for imparting drag forces of varying magnitude upon the line-carrying spool to resist rotation of the line carrying spool. A drag screw is rotatably axially movable to selectively determine the degree of resistance on rotation of the line-carrying spool applied by the drag imparted structure. An axially enlarged portion of the drag screw arrests axial movement of the drag screw by abutting the deck plate. An internally threaded drag adjustment knob threadably receives the drag screw to move the drag screw axially through rotation of the drag knob. The drag adjustment knob has a recess therein coaxial with an axis about which the drag screw is mounted. A spring activated retaining cup extends between the recess in the drag adjustment knob and a recess in the inside surface of the fishing reel housing.

13 Claims, 2 Drawing Sheets

DRAG MECHANISM FOR SPIN CAST REELS

BACKGROUND OF THE INVENTION

This invention pertains to fishing reels and, more particularly, to an improved drag mechanism for varying the drag on the line spool of a fishing reel.

Fishing reels, in particular spin cast fishing reels, have many different styles and types of drag assemblies for varying the tension on a line that will release the line spool with the reel in the retrieve mode. One such structure is shown in U.S. Pat. No. 4,778,120 to Finnley et al. A drag or clutch plate is mounted in abutment with a reel spool between the reel spool and a reel frame or deck plate. The clutch plate has a tab which extends into a hole in the deck plate to engage a slot in a forward facing end of a drag screw. The drag screw is moved axially forward to increase the pressure of the drag plate against the spool and drawn axially rearward to decrease the pressure of the drag plate on the spool, thus controlling the amount of drag force on the spool. The drag screw is moved axially forward and backward by threaded engagement with a thumb wheel screw accessible outwardly through a hole in the side wall of the reel housing. The thumb wheel is captured axially within a slot in a boss extending from the deck plate. The thumb wheel is rotatable in a plane generally transverse to the lengthwise axis of the reel extending through the drag screw.

The drag assembly disclosed in Finnley has several problems. First, the structure does not limit the extent to which the drag screw can be moved axially forward. Thus, the drag screw may be threaded axially forward to the point that the clutch plate puts so much pressure on the spool that the spool is pushed forward and interferes with the movement of the spinner head. Under these circumstances, the spinner head cannot freely rewind line onto the spool when, for example, a fish is being retrieved. Another problem with this structure is the axial rearward movement of the drag screw is not definitively limited. Rearward movement is typically halted by a rearward facing end of the drag screw engaging a rear portion of the reel housing. If, however, the tolerances of the reel are not carefully monitored, the rearward end of the drag screw may not hit the back of the housing until the tab of the drag plate has become disengaged with the slot in the forward facing end of the drag screw. Such disengagement may render it impossible for the slot in the forward end of the drag screw to reengage the tab on the drag plate without disassembly of the reel, seriously inhibiting the effectiveness of the drag mechanism during use of the reel. Finally, fitting the thumb wheel into the reel frame of Finnley et al. during manufacture may be difficult and time consuming. In the fishing reel art where manufacturing costs are a significant component in the product cost, this difficulty presents a serious problem.

SUMMARY OF THE INVENTION

The present invention is directed toward overcoming one or more of the problems discussed above.

The present invention is an improved drag adjustment mechanism in a fishing reel of the type having a housing and a line-carrying spool rotatable about a first axis to pay out line from the line-carrying spool. The improved drag adjustment mechanism includes a structure for selectively imparting a drag force, the structure being adjustable a) between a first position for causing a first force to be exerted on the line-carrying spool to resist rotation of the line-carrying spool about the first axis and b) a second position for causing a second force to be exerted on the line-carrying spool to resist rotation of the line-carrying spool about the first axis. The first force is greater than the second force. The improved drag adjustment mechanism further includes a drag adjustment knob rotatable about a second axis. The drag adjustment knob has a first recess therein through which the second axis extends. A structure is provided for selectively adjusting the drag imparting structure between its first and second positions as an incident of rotation of the drag adjustment knob about the second axis in a first direction and a direction opposite the first direction, respectively. The housing has an inside surface defining a second recess. A retaining cup extends into each of the recesses in the drag adjustment knob and the recess in the inside surface of the fishing reel housing to maintain the retaining cup in an operative position.

The retaining cup has first and second ends, a base wall at an end thereof and a cylindrical outer wall defining a spring chamber. One of the retaining cup ends extends into one of the first and second recesses. A spring extends into the other of the first and second recesses and is captively maintained between the retaining cup base wall and the one of the drag adjustment knob and the inside housing surface that defines the other of the first and second recesses.

The invention also contemplates an improved drag mechanism in a fishing reel of the type having a deck plate and a line-carrying spool rotatable about a first axis to pay out line from the line-carrying spool. The improved drag mechanism includes a drag imparting structure selectively adjustable between a) a first position for causing a first force to be exerted on the line-carrying spool to resist rotation of the line-carrying spool about the first axis and b) a second position for causing a second force to be exerted on a line-carrying spool to resist rotation of the line-carrying spool about the first axis. The first force is greater than the second force A drag screw is mounted for rotation about a second axis and operable by rotation in first and second opposite directions to selectively adjust the drag imparting structure between its first and second positions. A structure is provided on the drag screw for abutting the deck plate to arrest axial movement of the drag screw along the second axis as an incident of the drag screw being rotated in one of the first and second opposite directions of rotation.

The drag screw is externally threaded. A drag adjustment knob is provided, the drag adjustment knob being internally threaded. The drag adjustment knob threadably receives the drag screw. A structure is provided for fixing the axial position of the drag adjustment knob relative to the deck plate. The drag screw is axially movable toward the drag imparting means by rotation of the drag adjustment knob about the second axis in the first rotational direction and the drag screw is axially movable away from the drag imparting means by rotation of the drag adjustment knob in the second rotational direction. The drag screw is axially received through the deck plate and the abutting means on the drag screw for intercepting the deck plate is a radially enlarged portion of the drag screw. A structure is further provided on the drag screw for intercepting a forward facing surface of the drag adjustment knob to arrest axial movement of the drag screw along the second axis as an incident of the drag screw being rotated in the second direction of rotation. The structure for intercepting the deck plate and for intercepting the forward facing surface of the drag adjustment knob is a single radially enlarged portion of the drag screw.

The present invention provides a structure on the drag screw for preventing the drag screw from being axially threaded forward an amount that the drag plate puts excessive pressure on the spool. The present invention also provides a structure on the drag screw which prevents the drag screw from being axially threadably moved rearwardly to a point that the slot in the forward end of the drag screw becomes disengaged from the tab on the drag plate. The structure on the drag screw stopping the forward and rearward axial movement of the drag screw can be readily integrally formed with the drag screw, permitting its advantages to be realized at a minimal cost. Moreover, the structure on the drag screw can be easily adapted to many prior art reel designs without requiring extensive modification of the reels. In addition, the present invention provides a drag system wherein the thumb wheel may be fixed to the reel housing in a quick and easy manner, thus providing significant cost savings over prior art alternatives.

DETAILED DESCRIPTION OF THE PREFERRED EMBODIMENT

Figure 1:
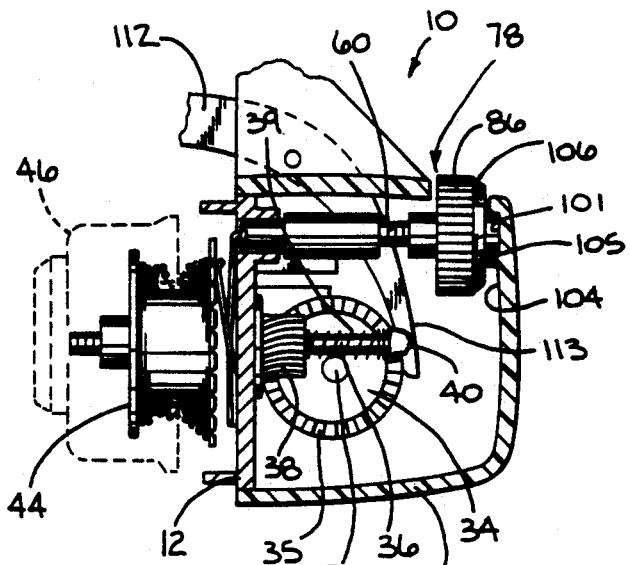
FIG. 1 is a sectional side elevation view of a fishing reel including the improved drag mechanism of the present invention.

A fishing reel 10, in particular a spin cast reel, includes a reel frame or deck plate 12, a forward housing portion (not shown) and a rear housing portion 14. The deck plate 12 is secured to the rear housing portion 14 by screws (not shown) which extend through rearward projecting cylindrical bosses 16,18 on the deck plate 12 into internally threaded bosses (not shown) on an interior wall of the rear housing portion 14. A third screw (not shown) extends through a hole 20 defined by the deck plate 12 and is threadably engaged in an internally threaded boss (not shown) on an interior wall of the rear housing portion 14.

A crank shaft 22 is mounted between a pair of rearward extending bosses 23,24 on the deck plate 12 for rotation about an axis 25. Each boss 23,24 has a cylindrical bore 26,27 coaxial with the axis 25. Opposite ends of the crank shaft 22 are mounted within the cylindrical bores 26,27 in the bosses 23,24 by one of a pair of sleeve inserts 28,29 which engage each end of the crank shaft 22 and function both as a bushing for facilitating rotation of the crank shaft 22 about the axis 25 and to radially secure the crank shaft 22 in the cylindrical bores 26,27 in the rearward extending bosses 23,24. The crank shaft 22 is axially secured in the cylindrical bores 26,27 by a pair of nuts 30,31 which threadably engage threaded ends 32,33 of the crank shaft 22. The crank shaft 22 further includes a face gear 34 concentrically mounted thereto transverse to the axis 25 with a plurality of axially extending teeth 35.

A center shaft 36 extends rearwardly and forwardly from the deck plate 12 along a first axis 37. A helical pinion gear 38 is splined on the center shaft 36 and abuts the rearward facing surface of the deck plate 12. A center shaft spring 39 is axially mounted around the rearwardly facing portion of the center shaft 36 and compressed between the pinion gear 38 and an enlarged head 40 on the rearward facing end of the center shaft 36. Mounted about an annular hub (not shown) integrally formed with and extending forwardly of the deck plate 12 is a line spool 42. Threadably secured to the forward facing end of the center shaft 36 around a forward facing wall 44 of the line spool 42 is a spinner head 46. The spinner head 46 has a radially projecting retractable pick-up pin 47.

The improved drag structure 48 includes a clutch plate 49 having a radially extending arm 50 with an axially rearward projecting tab 52 at the distal end thereof. The clutch plate 49 is coaxially mounted between the forward facing surface 53 of the deck plate 12 and the rearward facing surface 54 of the line spool 42 about the forward projecting annular hub of the deck plate 12. More particularly, between the clutch plate 49 and the forwardly facing surface 54 of the line spool 42 is a washer 56. The improved drag structure 48 further includes a rearward extending cylindrical boss 58 on the deck plate 12. A drag screw 60 has a forward portion 62 axially insertable in the rearward extending cylindrical boss 58 of the deck plate 12 about a second axis 59. A forward facing end 63 of the drag screw defines a slot 64.

One aspect of the improvement of the drag structure 48 lies in the drag screw 60. The drag screw 60 further includes an externally threaded portion 66 and a rearward end 68. Between the externally threaded portion 66 and the forward portion 62 is a radially enlarged portion 70 defining a forward blocking shoulder 72 and a rearward blocking shoulder 74. The drag screw 60 is inserted into a recess 75 in the cylindrical boss 58 in the deck plate 12, with the slot 64 in the forward facing end 63 of the drag screw 60 engaging the rearward extending tab 52 on the clutch plate 49 (see FIGS. 1, 3 and 4).

Figure 3:
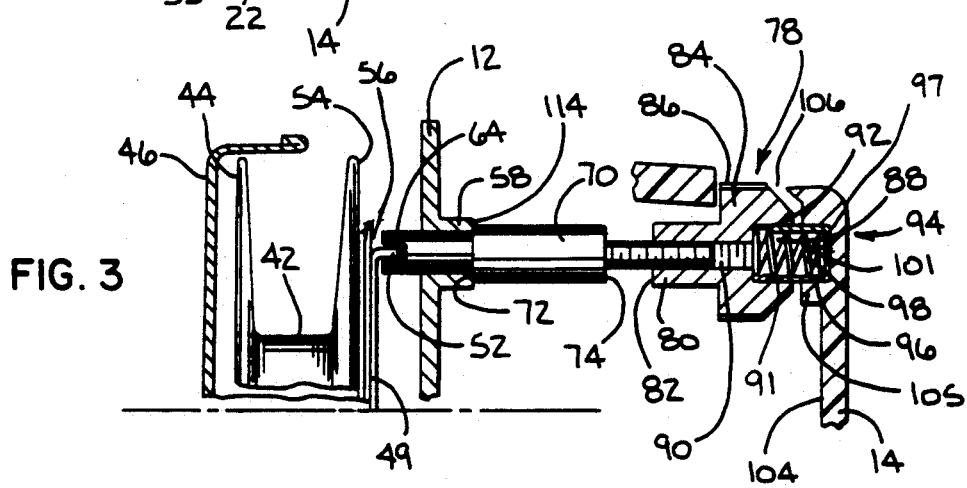
FIG. 3 is an enlarged fragmentary cross sectional side view of the improved drag mechanism of the present invention illustrated in its maximum drag imparting position.
Figure 4:
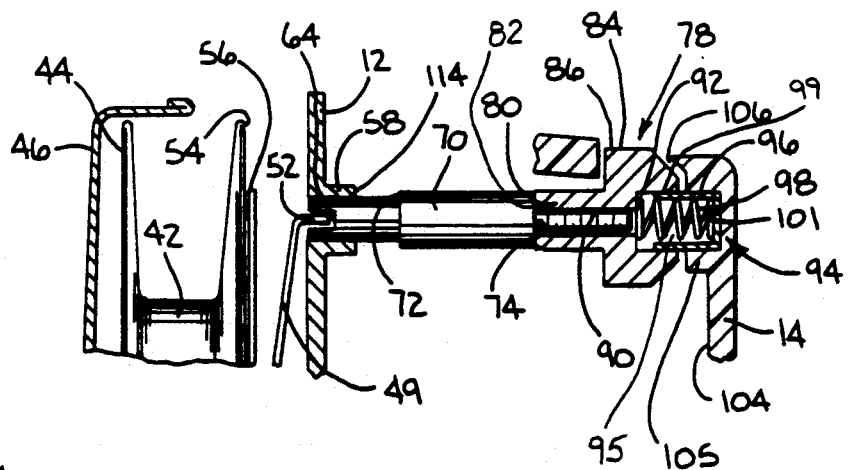
FIG. 4 is a view of the improved drag mechanism as in FIG. 3 with the drag mechanism in its minimum drag imparting position.

Another aspect of the improved drag structure 48 lies in a drag adjustment knob 78. The drag adjustment knob 78 has a forward extending internally threaded neck 80 with a forward facing surface 82 at the distal end thereof. The neck 80 axially threadably receives the threaded portion 66 of the drag screw 60. The drag adjustment knob 78 further includes a head 84 with a radially outward facing surface 86. A cylindrical bore 88 is defined in the rearward portion of the head 84 of the drag adjustment knob 78. As best seen in FIGS. 3 and 4, the cylindrical bore 88 is of a slightly larger diameter than the internally threaded portion 90 of the internally threaded neck 80, thus defining a recess 91 with a bottom step 92.

A spring activated retainer 94 is telescopically received in the cylindrical bore 88. The spring activated retainer 94 comprises a retainer cup 96 with spaced ends, a base wall 97, and a spring 98 mounted internally of the retainer cup 96 in a chamber 95 defined by a cylindrical peripheral wall 97 coaxial with the axis of the drag screw 60. One end of the spring 98 sits upon the step 92 in the drag adjustment knob 78 and the other end of the spring rests against the base wall 97 of the retainer cup 96. In this manner, the spring 98 urges the retainer cup 96 to telescope axially away from the adjustment knob 78. As best illustrated in FIGS. 1, 3 and 4, the top 100 of the retainer cup 96 is axially received in a cylindrical recess or hole 101 in the inside back surface 104 of the rear housing portion 14.

Preferably, a forward extending cylindrical boss 105 defines the hole/recess 101 in inside back surface 104 of the rear housing portion 14 for receiving the spring activated retainer 94. When spring activated retainer 94 is so received, the radially outward facing surface 86 of the drag adjustment knob 78 fits into an aperture 106 in the rear housing portion 14.

Figure 5:
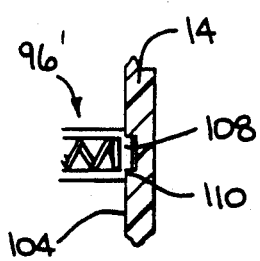
FIG. 5 is a side view of an alternative embodiment of a drag screw retainer that is part of the improved drag mechanism of the present invention.
Figure 2:
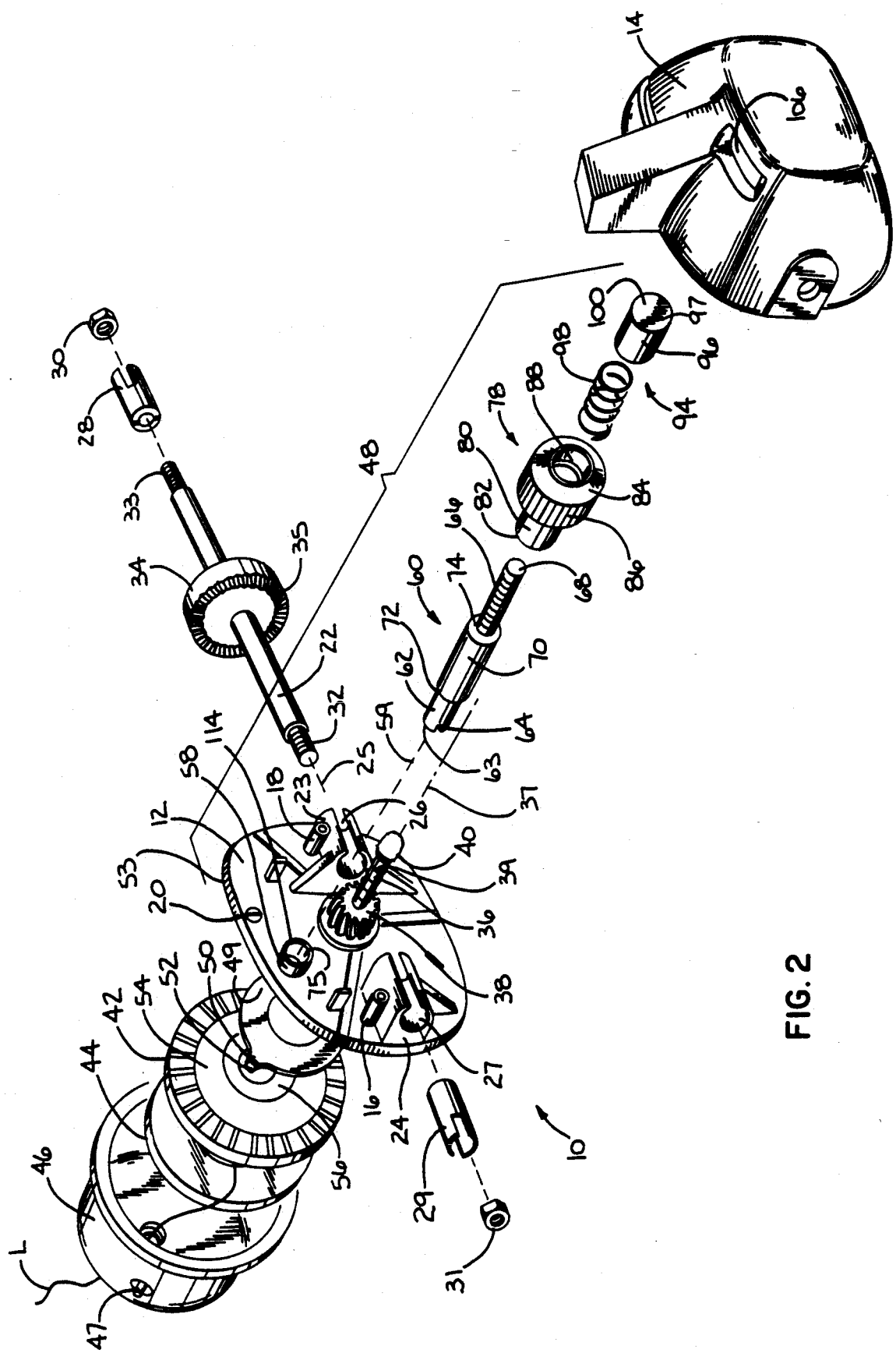
FIG. 2 is an exploded perspective view of a fishing reel having the improved drag mechanism of the present invention.

As illustrated in FIGS. 1, 3 and 4, the entire outer diameter of the retainer cup 96 is received in the bore 102. In another highly preferred embodiment illustrated in FIG. 5, the base wall 97 of the retainer cup 96 has a reduced diameter portion 108 defining an annular shoulder 110.

Line L can be payed out of the line spool 42 of the fishing reel 10 in two primary manners. In the first manner, the trigger arm 112 on the rear housing portion is drawn upward, causing an actuator arm 113 attached thereto to exert a forward directed force on the enlarged head portion 40 of the center shaft 36. This force causes the center shaft 36 to move axially forward relative to the deck plate 12 against the action of the center shaft spring 39. When the center shaft 39 is pushed forward, the spinner head 46 threadably engaged to a threaded forward end of the center shaft 36 is also pushed forward, trapping a line L between the spinner head 46 and the interior of the forward housing. This forward movement of the spinner head 46 also causes the retractable pick-up pin 47 to be drawn into the spinner head 46. When the trigger arm 112 is released, the center shaft spring 39 causes the spinner head 46 to move rearward relative to the deck plate and the forward housing, releasing the line L and allowing the line L to be freely payed out from the line spool 44 by forces pulling on the line L. Rotation of the center shaft 36 in a line retrieval direction causes the pick-up pin 47 to re-emerge from the spinner head 46 to thusly halt the free pay out of the line L. If, however, the force on the line L is sufficient to overcome frictional forces between the forward extending hub (not shown) on the deck plate 12 and the line spool 42 mounted thereon, the line spool 42 will rotate relative to the deck plate 12 and this rotation will also cause payout of the line L.

The improved drag structure 48 functions to control the tension in the line L by permitting controlled rotation of the line spool 42 and thus controlled release of the line L. More particularly, the improved drag mechanism 48 functions by causing the clutch plate 49 to exert a pressure on the rearward facing surface 54 of the line spool 52. How this pressure is exerted is best understood with reference to FIGS. 3 and 4. When the drag adjustment knob 78 is caused to rotate about the second axis 76 by a user engaging the radially outward facing surface 86 with his/her thumb, the drag adjustment knob 78 is axially secured relative to the deck plate 12 by the portion of the rear housing portion 14 defining the aperture 106. Rotation of the drag knob in a clockwise direction when viewed from the back of the rear housing portion 14 causes the drag screw 60 to move forward relative to the deck plate 12 by the threaded engagement between the internally threaded neck 80 of the drag adjustment knob 78 and the externally threaded portion 66 of the drag screw 60. As the drag screw 60 is axially driven forward, the forward facing end 62 is pushed against the forward facing surface 54 of the line spool 42, thus putting a pressure on the line spool which inhibits its rotation. More specifically, the slot 64 in the forward facing end 63 of the drag screw 60 engages the rearward extending tab 52 in the clutch plate 48, driving the clutch plate against the washer 56 which in turn puts a pressure on the rearwardly facing surface 54 of the line spool 42. If, as in prior art drag mechanisms, no structure is provided for stopping the forward axial movement of the drag screw 60, the drag screw 60 will exert a greater and greater pressure upon the line spool 42, possibly causing the line spool 42 to come in contact with the spinner head 46. This condition results in an interference with the free rotation of the spinner head 46 during line retrieval, and thus inhibits the proper operation of the reel 10.

To prevent this condition, the improved drag mechanism 48 provides a radially enlarged portion 70 on the drag screw 60. As illustrated in FIG. 3, the forward blocking shoulder 72 of the drag screw 60 will halt forward axial movement of the drag screw 60 by abutting the rearward facing end 114 of the cylindrical boss 58. In this manner, excessive pressure on the line spool 42 is averted. As illustrated in FIG. 4, in a similar manner the rearward blocking shoulder 74 prevents excessive rearward movement of the drag screw 60. Axial rearward movement of the drag screw 60 is accomplished by turning the drag adjustment knob 78 counterclockwise. In certain prior art structures the drag screw 60 could be withdrawn to the point that the rearward extending tab 52 of the clutch plate 49 would disengage the slot 64 of the drag screw 60. This disengagement could lead to failure of the drag mechanism 48 and require reconstruction of the drag mechanism 48. The rearward blocking shoulder 74 of the present invention engages the forward facing end 82 of the drag adjustment knob 78 before the drag screw 60 is moved axially rearward to the point the tab 52 becomes disengages from the slot 64. Thus, the blocking shoulders 72,74 formed by the enlarged portion 70 of the drag screw 60 permit the drag mechanism to be operated within a range of drags without concern for damaging the reel or the drag mechanism.

The spring activated retainer 78 secures the drag screw 60 in alignment with a second axis 59 in a manner that permits expedient assembly of the improved drag mechanism 48. The drag screw 60 can be quickly and easily located in the rear housing portion 14 of the reel 10 by aligning the retainer cup 96 in the hole 101 and pushing the drag adjustment knob 78 rearwardly, thus compressing the spring 98 and telescoping the retainer cup 96 into the cylindrical bore 88 in the drag adjustment knob 78. The retainer cup 96 is telescoped until the radially outward facing surface 86 of the drag adjustment knob 78 protrudes through the aperture 106 in the rear housing portion 14. When the drag adjustment knob 78 protrudes through the aperture 106 as illustrated in FIGS. 3 and 4, the knob 78 is axially held in place by the force of the spring 98 pushing the knob 78 against the forward portion of the rear housing portion 14 defining the aperture 106. Thus, the need to rivet the adjustment knob or otherwise secure it in place, as required in some prior art structures, is liminated, saving valuable production time and simplifying the production process.

The alternative embodiment of the retainer cup 96 illustrated in FIG. 4 reduces friction between the cup 96 and the rearward portion of the rear housing portion defining the hole 102. That is, only the annular shoulder 110 of the retainer cup 96 engages the interior wall 104 of the rear housing portion 14, providing a smaller surface area and therefore smaller frictional area.

The improved drag mechanism of the present invention permits a wide range of drag pressures to be exerted against the spool while at the same time preventing excessive pressure against the spool which may cause interference with the spinner head. Moreover, the improved drag mechanism prevents the drag screw from becoming disengaged from the clutch plate and therefore damaging the drag mechanism. The spring activated retainer of the present invention permits the drag adjustment knob to be securely axially fixed to the reel housing in an expedient manner, saving both production time and production cost. Finally, the parts from which the improved drag mechanism is configured are easy and inexpensive to manufacture, thus reducing the cost of reels incorporating the improved drag structure.

We claim:

1. An improved drag adjustment mechanism in a fishing reel having a housing, a deck plate and a line-carrying spool on the deck plate and rotatable about a first axis to pay out line from the line-carrying spool, wherein the improvement comprises:

a drag imparting means on at least one of the housing and deck plate and selectively adjustable between a) a first position for causing a first force to be exerted on the line-carrying spool to resist rotation of the line-carrying spool about the first axis and b) a second position for causing ak second force to be exerted on the line-carrying spool to resist rotation of the line-carrying spool about the first axis, said first force being greater than the second force; a drag adjustment knob;

means for mounting the drag adjustment knob to at least one of the deck plate and housing for rotation about a second axis, the drag adjustment knob having a first recess therein through which the second axis extends;

means cooperating between the drag adjustment knob and drag imparting means for selectively adjusting the drag imparting means between its first and second positions as an incident of rotation of the drag adjustment knob about the second axis in a first direction and a direction opposite the first direction, respectively;

said housing having in inside surface defining a second recess; and a retaining means extending into each of the recess in the drag adjustment knob and the recess in the inside surface of the fishing reel housing for maintaining the drag adjustment knob in an operative position on the reel housing.

2. The improved drag adjustment mechanism according to claim 1 wherein the retaining cup has first and second ends, a base wall at one of the first and second ends, and a cylindrical outer wall defining a spring chamber, said one retaining cup end extending into one of the first and second recesses, and there is a spring that extends into the other of the first and second recesses and is captively maintained between the retaining cup base wall and the one of the drag adjustment knob and inside housing surface that defines the other of the first and second recesses.

3. An improved drag adjustment mechanism in a fishing reel having a housing, a deck plate and a line-carrying spool on the deck plate and rotatable about a first axis to pay out line from the line-carrying spool, wherein the improvement comprises:

a drag imparting means on at least one of the housing and deck plate and selectively adjustable between a) a first position for causing a first force to be exerted on the line-carrying spool to resist rotation of the line-carrying spool about the first axis and b) a second position for causing a second force to be exerted on the line-carrying spool to resist rotation of the line-carrying spool about the first axis, said first force being greater than the second force; a drag screw;

means mounting the drag screw to at least one of the housing and deck plate for rotation about a second axis so that the drag screw is operable by rotation in first and second opposite directions;

there being means cooperating between the drag screw and drag imparting means to selectively adjust the drag imparting means between its first and second positions by axial movement of the drag screw along the second axis; and means on the drag screw for abutting the deck plate to arrest axial movement of the drag screw along the second axis as an incident of the drag screw being rotated in one of the first and second opposite directions of rotation.

4. The improved drag adjustment mechanism according to claim 3 wherein the drag screw is externally threaded, the improved drag adjustment mechanism further including an internally threaded drag adjustment knob, the drag adjustment knob threadably receiving the drag screw, there being means for fixing the axial position of the drag adjustment knob relative to the deck plate, the drag screw being axially movable along the second axis to place the drag imparting means in its first position by rotation of the drag adjustment knob about the second axis in said first rotational direction and the drag screw being axially movable along the second axis to place the drag imparting means in its second position by rotation of the drag adjustment knob in the second rotational direction.

5. The improved drag adjustment mechanism according to claim 4 where the drag adjustment knob has a forward facing surface and further including means on the drag screw for intercepting the forward facing surface of the drag adjustment knob to arrest axial movement of the drag screw along the second axis as an incident of the drag screw being rotated in the second rotational direction.

6. The improved drag adjustment mechanism according to claim 5 wherein the means on the drag screw for intercepting the deck plate and for arresting axial movement of the drag screw in each direction along the second axis is a single radially enlarged portion of the drag screw.

7. The improved drag adjustment mechanism according to claim 3 wherein the drag screw is axially received through the deck plate and the abetting means on the drag screw for intercepting the deck plate comprises a radially enlarged portion of the drag screw.

8. An improved drag adjustment mechanism in a fishing reel having a housing, a deck plate and a line-carrying spool rotatable about a first axis and residing at least partially within the housing, wherein the improvement comprises:

a drag imparting means on at least one of the housing and deck plate and including an externally threaded drag screw selectively adjustable between a) a first position for causing a first force to be exerted on the line-carrying spool to resist rotation of the line-carrying spool about the first axis and b) a second position for causing a second force to be exerted on the line-carrying spool to resist rotation of the line-carrying spool about the first axis, said first force being greater than the second force;

an externally threaded drag screw;

means mounting the drag screw to at least one of the housing and deck plate for rotation about a second axis and, as an incident thereof, for movement of the drag screw along the second axis in first and second axial directions;

there being cooperating means on the drag imparting means and drag screw for selectively placing the drag imparting means in the first and second positions therefor in response to rotation of the drag screw;

means on the drag screw for abutting the deck plate to thereby arrest axial movement of the drag screw along the second axis in one of the first and second axial directions that places the drag imparting means in its first position;

an internally threaded drag adjustment knob for threadably receiving the drag screw, there being means on at least one of the deck plate and housing for limiting movement of the drag adjustment knob axially relative to the deck plate, the drag screw being axially movable by rotation of the drag adjustment knob, with the drag adjustment knob having a recess therein through which the second axis extends;

a spring; and a retaining cup for the drag adjustment knob within which the spring is received, the retaining cup being urged by the spring to extend between the recess in the drag adjustment knob and a recess in the fishing reel housing.

9. The improved drag adjustment mechanism according to claim 8 wherein the spring activated retaining cup is telescopically received within the recess in the drag adjustment knob against the action of a spring disposed within the recess in the drag adjustment knob.

10. The improved drag adjustment mechanism according to claim 8 wherein the drag screw is axially received through the deck plate and the means on the drag screw for intercepting the deck plate is a radially enlarged portion of the drag screw.

11. The improved drag adjustment mechanism according to claim 8 wherein the drag adjustment knob has a forward facing surface and further including means on the drag screw for intercepting the forward facing surface of the drag adjustment knob to arrest axial movement of the drag screw along the second axis in the other of the first and second axial directions.

12. The improved drag adjustment mechanism according to claim 11 wherein the means on the drag screw for intercepting the deck plate and for arresting axial movement of the drag screw in the one axial direction and the means on the drag screw for intercepting the forward facing surface of the drag adjustment knob for stopping axial movement of the drag screw in the other axial direction is a single radially enlarged portion of the drag screw.

13. An improved drag adjustment mechanism in a fishing reel having a housing, a deck plate and a line-carrying spool rotatable about a first axis and residing at least partially within the housing wherein the improvement comprises:

a drag imparting means on at least one of the housing and deck plate selectively adjustable between a) a first position for causing a first force to be exerted on the line-carrying spool to resist rotation of the line-carrying spool about the first axis and b) a second position for causing a second force to be exerted on the line-carrying spool to resist rotation of the line-carrying spool about the first axis, said first force being greater than the second force;

a drag adjustment knob;

means for mounting the drag adjustment knob to at least one of the deck plate and housing for rotation about a second axis, the drag adjustment knob having a first recess therein through which the second axis extends;

means cooperatively between the drag adjustment knob and drag imparting means for selectively adjusting the drag imparting means between its first and second positions as an incident of rotation of the drag adjustment knob about the second axis in a first direction and a direction opposite the first direction, respectively;

said housing having an inside surface defining a second recess; and a retaining cup cooperatively extending into each of the recess in the drag adjustment knob and the recess in the inside surface of the fishing reel housing, the retaining cup having first and second ends, a base wall at one of the first and second ends, and a cylindrical outer wall defining a spring chamber, said one retaining cup end extending into one of the first and second recesses, and a spring extending into the other of the first and second recesses, the spring being captively maintained between the retaining cup base wall and the one of the drag adjustment knob and inside housing surface that defines the other of the first and second recesses.

* * * * *